(12) United States Patent
Fujio

(10) Patent No.: US 8,771,092 B2
(45) Date of Patent: Jul. 8, 2014

(54) FIXED TYPE CONSTANT VELOCITY UNIVERSAL JOINT

(75) Inventor: Teruaki Fujio, Iwata (JP)

(73) Assignee: NTN Corporation, Osaka (JP)

( * ) Notice: Subject to any disclaimer, the term of this patent is extended or adjusted under 35 U.S.C. 154(b) by 19 days.

(21) Appl. No.: 13/501,140

(22) PCT Filed: Nov. 2, 2010

(86) PCT No.: PCT/JP2010/069467
§ 371 (c)(1),
(2), (4) Date: Apr. 10, 2012

(87) PCT Pub. No.: WO2011/065193
PCT Pub. Date: Jun. 3, 2011

(65) Prior Publication Data
US 2012/0202607 A1    Aug. 9, 2012

(30) Foreign Application Priority Data

Nov. 25, 2009   (JP) ................................. 2009-267637

(51) Int. Cl.
*F16D 3/226*    (2006.01)

(52) U.S. Cl.
USPC .......................... 464/144; 464/145; 464/906

(58) Field of Classification Search
USPC .................. 464/144, 145, 146, 906
See application file for complete search history.

(56) References Cited

U.S. PATENT DOCUMENTS

| | | | |
|---|---|---|---|
| 4,116,020 A | * | 9/1978 | Aucktor et al. ............... 464/145 |
| 4,156,353 A | * | 5/1979 | Welschof ...................... 464/145 |
| 4,950,206 A | * | 8/1990 | Jacob ........................ 464/145 X |
| 5,647,800 A | * | 7/1997 | Warnke et al. ................. 464/144 |
| RE35,995 E | * | 12/1998 | Krude et al. ................... 464/145 |

(Continued)

FOREIGN PATENT DOCUMENTS

| CN | 101578458 A | 11/2009 |
|---|---|---|
| EP | 1 707 835 A1 | 10/2006 |

(Continued)

OTHER PUBLICATIONS

International Preliminary Report on Patentability and Written Opinion of the International Searching Authority issued Jun. 14, 2012 in International (PCT) Application No. PCT/JP2010/069467.

(Continued)

*Primary Examiner* — Gregory Binda
*Assistant Examiner* — Matthieu Setliff
(74) *Attorney, Agent, or Firm* — Wenderoth, Lind & Ponack, L.L.P.

(57) ABSTRACT

A fixed type constant velocity universal joint is configured such that an axial offset amount of a curvature center of each track groove of an outer joint member and an axial offset amount of a curvature center of each track groove of an inner joint member are zero. Track grooves of the outer joint member are formed alternately in a circumferential direction to be inclined in mutually opposite directions with respect to an axis, and track grooves of the inner joint member are formed alternately in the circumferential direction to be inclined in mutually opposite directions with respect to the axis. An outer surface of the inner joint member is formed into a spherical surface which is held in slide-contact with an inner spherical surface of a cage. An inner surface of the outer joint member is formed into a cylindrical surface.

15 Claims, 15 Drawing Sheets

(56) References Cited

U.S. PATENT DOCUMENTS

| | | |
|---|---|---|
| 6,497,622 B1 | 12/2002 | Bilz et al. |
| 6,652,385 B2 * | 11/2003 | Kadota et al. ................ 464/145 |
| 6,672,965 B2 * | 1/2004 | Hildebrandt et al. ......... 464/145 |
| 6,709,338 B2 * | 3/2004 | Weckerling et al. .......... 464/145 |
| 6,817,950 B2 * | 11/2004 | Dine ............................. 464/145 |
| 7,022,022 B2 * | 4/2006 | Hassenrik et al. ............ 464/145 |
| 7,235,017 B2 * | 6/2007 | Clemm et al. ................ 464/144 |
| 7,674,183 B2 * | 3/2010 | Lutz et al. .................... 464/145 |
| 2002/0128079 A1* | 9/2002 | Hildebrandt et al. ......... 464/145 |
| 2004/0072622 A1* | 4/2004 | Hassenrik et al. ............ 464/145 |
| 2007/0161428 A1 | 7/2007 | Nakao et al. |
| 2008/0085776 A1 | 4/2008 | Frost et al. |

FOREIGN PATENT DOCUMENTS

| | | |
|---|---|---|
| JP | 11-227478 | 8/1999 |
| JP | 11-227479 | 8/1999 |
| JP | 2001-330052 | 11/2001 |
| JP | 2001-347845 | 12/2001 |
| JP | 2008-087517 | 4/2008 |
| JP | 2009250365 A * | 10/2009 |

OTHER PUBLICATIONS

International Search Report issued Feb. 8, 2011 in International (PCT) Application No. PCT/JP2010/069467.
Chinese Office Action issued Feb. 28, 2014 in corresponding Chinese Application No. 201080051674.4 (with partial English translation).

* cited by examiner

_US 8,771,092 B2_

FIXED TYPE CONSTANT VELOCITY UNIVERSAL JOINT

TECHNICAL FIELD

The present invention relates to a constant velocity universal joint for use, for example, in a power transmission system for automobiles and various industrial machines.

BACKGROUND ART

In a 4-wheel drive vehicle (4WD vehicle), a rear-wheel drive vehicle (FR vehicle), and the like, a propeller shaft is used for transmitting a rotational drive force from a transmission to a differential. In such a propeller shaft, at the time of vehicle crash, the propeller shaft stiffens, to thereby increase an impact force generated on a vehicle. Thus, a pipe part coupled to a constant velocity universal joint is bent in a laterally-laid V-shape so that the bent part sometimes intrudes into a vehicle interior.

Accordingly, there are conventionally proposed various mechanisms for absorbing axial displacement generated at the time of crash (Patent Literature 1 to Patent Literature 3). As disclosed in Patent Literature 1, the tubular shaft is coupled to the outer joint member of the constant velocity universal joint, and at the time of impact, the inner-joint-member peripheral unit (interior parts) of the constant velocity universal joint (such as the stub shaft, the inner joint member, the balls, and the cage) can push the sealing plate aside to thrust into the hollow portion of the tubular shaft. As disclosed in Patent Literature 2, the tubular shaft is coupled to the outer joint member of the constant velocity universal joint, and at the time of impact, the shaft can break through the sealing plate to thrust into the hollow portion of the tubular shaft. As disclosed in Patent Literature 3, at the time of impact, the inner joint member of the constant velocity universal joint can push the sealing plate aside to thrust into the hollow portion of the tubular shaft.

By the way, Patent Literatures above each disclose a plunging type constant velocity universal joint allowing axial displacement as the constant velocity universal joint. However, a fixed type constant velocity universal joint illustrated in FIG. 23 is also used for the propeller shaft.

The fixed type constant velocity universal joint illustrated in FIG. 23 comprises: an outer joint member 3 having an inner spherical surface 1 in which a plurality of track grooves 2 are formed equiangularly along an axial direction; an inner joint member 6 having an outer spherical surface 4 in which a plurality of track grooves 5 paired with the track grooves 2 of the outer joint member 3 are formed equiangularly along the axial direction; a plurality of balls 7 interposed between the track grooves 2 of the outer joint member 3 and the track grooves 5 of the inner joint member 6, for transmitting torque; and a cage 8 interposed between the inner spherical surface 1 of the outer joint member 3 and the outer spherical surface 4 of the inner joint member 6, for retaining the balls 7. In the cage 8, a plurality of pockets 9 for receiving the balls 7 therein are provided along a peripheral direction.

A female spline 10 is formed in an inner surface of a hole portion of the inner joint member 6. Into the hole portion of the inner joint member 6, a male spline 12 of a shaft 11 is fitted, and thus the male spline 12 is fitted to the female spline 10 of the inner joint member 6. Further, to an end portion of the male spline 12, a snap ring 13 for preventing slipping-off is fitted.

In order to seal opening portions of the outer joint member 3, an end cap 15 and a flexible boot 16 are mounted thereto.

The flexible boot 16 comprises a bellows 18 made of a rubber material or a resin material, and a cylindrical adapter 19 made of a metal. The bellows 18 comprises a small-diameter end portion 18a outwardly fitted to the shaft 11, a large-diameter end portion 18b connected to the adapter 19, and a bent portion 18c provided between the small-diameter end portion 18a and the large-diameter end portion 18b. The small-diameter end portion 18a of the bellows 18 is fastened by a band 20 and thus fixed to the shaft 11. The adapter 19 comprises a caulked portion 19a caulked and fixed to the large-diameter end portion 18b of the bellows 18, and an annular flange portion 19b fitted to the outer joint member 3. Note that, the end cap 15 comprises a body portion 15a shaped into a bottomed short cylinder, and an annular flange portion 15b fitted to the outer joint member 3.

A curvature center O2 of the track groove 5 of the inner joint member 6 is displaced from a joint center O to the end cap side in the axial direction. A curvature center O1 of the track groove 2 of the outer joint member 3 is displaced from the joint center O to the flexible boot side in the axial direction. That is, the curvature center O2 of the track groove 5 of the inner joint member 6 and the curvature center O1 of the track groove 2 of the outer joint member 3 are offset with respect to the joint center O by equal distances F, F in axially opposite directions.

As illustrated in FIG. 24, a companion flange 41 is mounted to the outer joint member 3. The companion flange 41 comprises: a base 41a mounted to the opening portion of the outer joint member 3 situated on a side opposite to the adapter 19; and a cylinder body 41b provided continuously to the base 41a. The base 41a comprises a thick portion 42 and a thin portion 43, and the end cap 15 is inwardly fitted to the thick portion 42.

CITATION LIST

Patent Literature 1: JP 11-227478 A
Patent Literature 2: JP 11-227479 A
Patent Literature 3: JP 2001-347845 A

SUMMARY OF INVENTION

Technical Problem

The constant velocity universal joints described in Patent Literature 1 to Patent Literature 3 are each a plunging type constant velocity universal joint. Accordingly, the constant velocity universal joints described in Patent Literature 1 to Patent Literature 3 can form the impact absorbing mechanism as described above. However, in the fixed type constant velocity universal joint as illustrated in FIG. 23, as described above, an outer spherical surface 8a of the cage 8 is held in slide-contact with the inner surface (inner spherical surface) 1 of the outer joint member 3, and an inner spherical surface 8b of the cage 8 is held in slide-contact with the outer surface (outer spherical surface) 4 of the inner joint member 6. Thus, it is impossible to obtain a structure enabling the interior parts and the like to thrust into the hollow portion of the tubular shaft.

That is, as illustrated in FIG. 24, the cage 8 is held in spherical-surface contact with the outer joint member 3 on a joint deep side and a joint inlet side with respect to a plane S which passes through the center O and is orthogonal to an axial center of the shaft (in a state in which an operating angle is formed). Thus, the cage 8 has high axial strength in a contact range H1 on the joint deep side and a contact range H2 on the joint inlet side. Therefore, even in a case where an impact load is applied in an arrow "A" direction of FIG. 24, the shaft 11 cannot be moved in the arrow "A" direction. Accordingly, as described above, at the time of vehicle crash, the propeller shaft stiffens, to thereby increase the impact force generated on a vehicle.

Therefore, in view of the above-mentioned circumstances, the present invention provides a fixed type constant velocity universal joint capable of suppressing heat generation through reduction of a spherical-surface contact of the cage, improving durability, and absorbing and lessening an impact at the time of application of the impact load.

Solution to Problem

The present invention provides a first fixed type constant velocity universal joint, comprising: an outer joint member having an inner surface in which track grooves are formed, the track grooves each having a bottom surface formed of a circular arc surface; an inner joint member having an outer surface in which track grooves are formed, the track grooves each having a bottom surface formed of a circular arc surface; a plurality of torque transmitting balls arranged in ball tracks formed by pairs of the track grooves of the outer joint member and the track grooves of the inner joint member; and a cage interposed between the inner surface of the outer joint member and the outer surface of the inner joint member, for retaining the plurality of torque transmitting balls, wherein: an axial offset amount of a curvature center of each of the track grooves of the outer joint member and an axial offset amount of a curvature center of each of the track grooves of the inner joint member are zero; the track grooves of the outer joint member are formed alternately in a circumferential direction to be inclined in mutually opposite directions with respect to an axis, and the track grooves of the inner joint member are formed alternately in the circumferential direction to be inclined in mutually opposite directions with respect to the axis; and a deep side of the inner surface of the outer joint member with respect to a joint center is formed into a cylindrical surface, and an inlet side of the inner surface of the outer joint member with respect to the joint center is formed into a spherical surface which is held in slide-contact with an outer spherical surface of the cage.

The present invention provides a second fixed type constant velocity universal joint, comprising: an outer joint member having an inner surface in which track grooves are formed, the track grooves each having a bottom surface formed of a circular arc surface; an inner joint member having an outer surface in which track grooves are formed, the track grooves each having a bottom surface formed of a circular arc surface; a plurality of torque transmitting balls arranged in ball tracks formed by pairs of the track grooves of the outer joint member and the track grooves of the inner joint member; and a cage interposed between the inner surface of the outer joint member and the outer surface of the inner joint member, for retaining the plurality of torque transmitting balls, wherein: an axial offset amount of a curvature center of each of the track grooves of the outer joint member and an axial offset amount of a curvature center of each of the track grooves of the inner joint member are zero; the track grooves of the outer joint member are formed alternately in a circumferential direction to be inclined in mutually opposite directions with respect to an axis, and the track grooves of the inner joint member are formed alternately in the circumferential direction to be inclined in mutually opposite directions with respect to the axis; and an inlet side of the inner surface of the outer joint member with respect to a joint center is formed into a cylindrical surface, and a deep side of the inner surface of the outer joint member with respect to the joint center is formed into a spherical surface which is held in slide-contact with an outer spherical surface of the cage.

According to the first and second fixed type constant velocity universal joints, the track offset amounts are zero, and the adjacent track grooves cross each other alternately. Thus, forces act alternately on adjacent pocket portions, and wedge angles are formed in alternately opposite directions. Accordingly, a position of the cage is stabilized at a position in a bisecting plane of the inner and outer joint members, and even in a state in which the cage is not held in contact with the inner surface (inner spherical surface) of the outer joint member, the joints of the present invention work as fixed type constant velocity universal joints.

According to the first fixed type constant velocity universal joint, the deep side of the inner surface of the outer joint member with respect to the joint center is formed into the cylindrical surface. Thus, in the first fixed type constant velocity universal joint, the outer joint member can be reduced in axial strength on the deep side with respect to the joint center. In addition, on the inlet side with respect to the joint center, the outer joint member can contact the cage, and hence the outer joint member can be increased in axial strength on the inlet side with respect to the joint center. A contact between the inner surface of the outer joint member and the outer spherical surface of the cage is produced at the spherical surface of the inner surface, and hence the spherical-surface contact of the cage is reduced.

According to the second fixed type constant velocity universal joint, the inlet side of the inner surface of the outer joint member with respect to the joint center is formed into the cylindrical surface. Thus, in the second fixed type constant velocity universal joint, the outer joint member can be reduced in axial strength on the inlet side with respect to the joint center. In addition, on the deep side with respect to the joint center, the outer joint member can contact the cage, and hence the outer joint member can be increased in axial strength on the deep side with respect to the joint center. A contact between the inner surface of the outer joint member and the outer spherical surface of the cage is produced at the spherical surface of the inner surface, and hence the spherical-surface contact of the cage is reduced.

According to the first and second fixed type constant velocity universal joints, the finishing performed on the inner surface of the outer joint member can be omitted. Further, the inner surface of the outer joint member may be formed by forging. Still further, the finishing performed on the outer surface of the cage may be omitted. In the respective fixed type constant velocity universal joints, the track grooves may be formed by forging, or the track grooves may be formed by machining.

In the respective fixed type constant velocity universal joints, the number of the plurality of torque transmitting balls is selected from 6, 8, or 10.

In the respective fixed type constant velocity universal joints, the curvature center of each of the track grooves of the outer joint member and the curvature center of each of the track grooves of the inner joint member may be displaced in a radial direction with respect to the joint center. In this case, the curvature center of each of the track grooves of the outer joint member can be displaced in a separating direction with respect to the joint center, or the curvature center of each of the track grooves of the outer joint member can be displaced in an approaching direction with respect to the joint center.

The respective fixed type constant velocity universal joints can be used for a propeller shaft of an automobile.

Advantageous Effects of Invention

According to the fixed type constant velocity universal joints of the present invention, the spherical-surface contact of the cage is reduced, and heat to be generated by friction or the like can be suppressed. Thus, it is possible to improve durability. Further, axial strength of the deep side or the inlet side with respect to the joint center can be reduced. When the impact load is applied, the cage is likely to slip out of the outer joint member to the side that is reduced in axial strength. However, the balls are fitted in the cage, and in addition, on the side held in contact with the spherical surface of the inner surface of the outer joint member, the cage is increased in axial strength. Accordingly, when the impact load is applied, the cage is broken so that the shaft can be moved relative to the outer joint member toward the side that is reduced in axial strength. This can absorb the impact load or lessen the impact.

A contact area between the cage and the inner surface of the outer joint member is small. Thus, in those fixed type constant velocity universal joints, the inner surface of the outer joint member and the outer spherical surface (outer surface) of the cage do not need to be subjected to precision machining such as cutting of hardened steel or grinding performed after heat treatment. As a result, it is possible to reduce cost and to improve productivity.

The fixed type constant velocity universal joints generally use six balls, but the present invention is also applicable to joints using eight balls or ten balls. Thus, when the number of balls is increased, it is possible to reduce a size and a weight of the joint while ensuring a load capacity.

In a case where the curvature center of each of the track grooves of the outer joint member and the curvature center of each of the track grooves of the inner joint member are displaced in the separating direction with respect to the joint center, the track grooves of the outer joint member can be enlarged (deepened), and the load capacity can be increased. In addition, a thickness of an opening portion at an axial end portion of each of the track grooves of the inner joint member can be increased, and the inner joint member can be stably coupled to the shaft which is fitted into a hole portion of the inner joint member. Further, in a case where the curvature center of each of the track grooves of the outer joint member and the curvature center of each of the track grooves of the inner joint member are displaced in the approaching direction with respect to the joint center O, the load capacity of the track grooves of the inner joint member can be increased, and a thickness of the outer joint member can be increased, which stabilizes strength.

According to the fixed type constant velocity universal joints of the present invention, the joints smoothly work under high load and during high-speed rotation, and heat generation is suppressed, with the result that durability can be improved. Therefore, the present invention is best suited for a fixed type constant velocity universal joint used for a propeller shaft of an automobile.

DESCRIPTION OF EMBODIMENTS

Hereinafter, embodiments of the present invention are described with reference to FIGS. 1 to 22.

Figure 1:
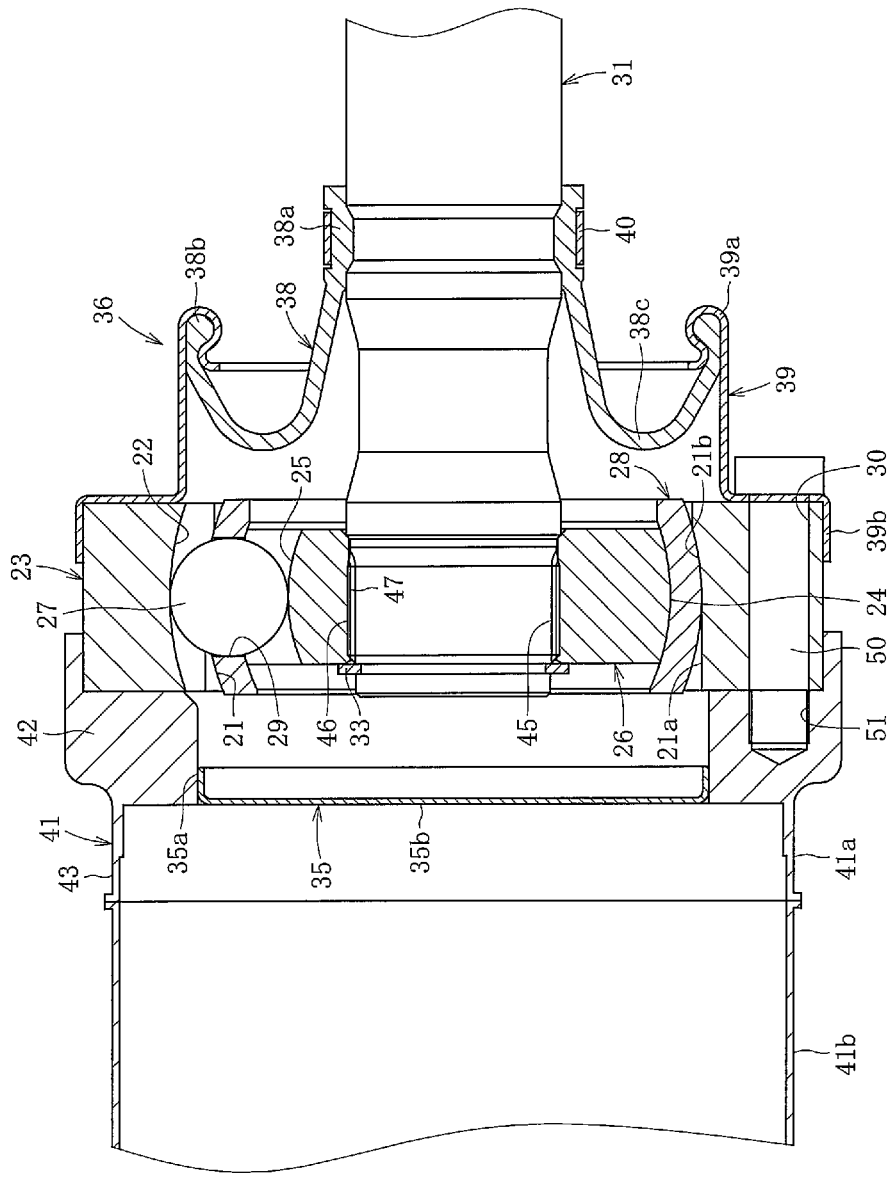
[FIG. 1] A cross-sectional view illustrating a fixed type constant velocity universal joint according to a first embodiment of the present invention.
Figure 2:
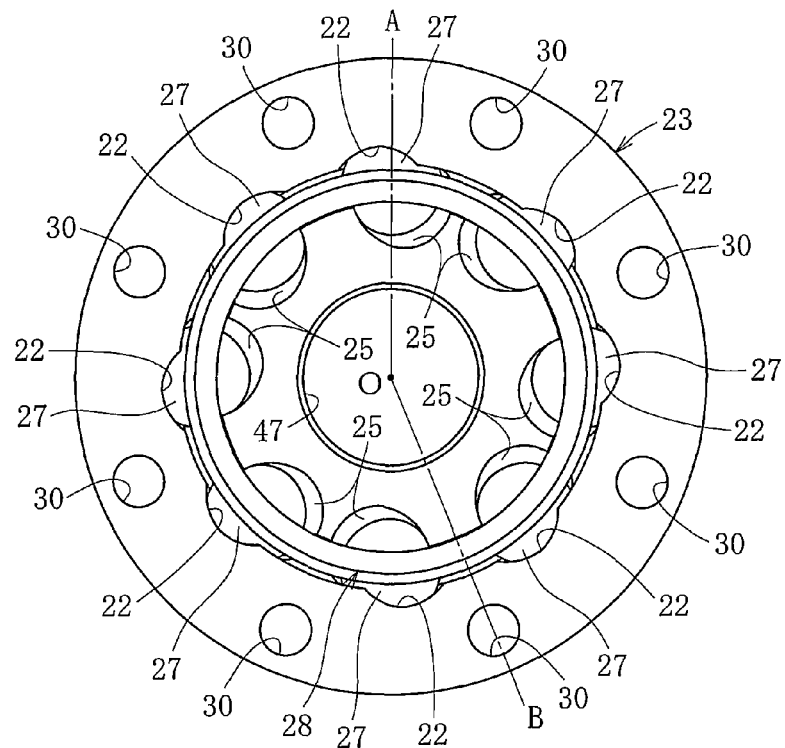
[FIG. 2] A front view illustrating a main part of the fixed type constant velocity universal joint of FIG. 1.
Figure 3:
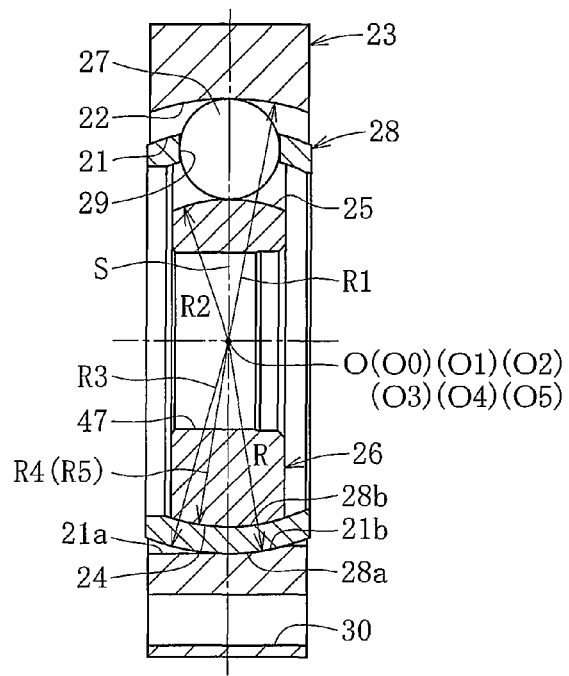
[FIG. 3] A cross-sectional view taken along the line A-O-B of FIG. 2.
Figure 4:
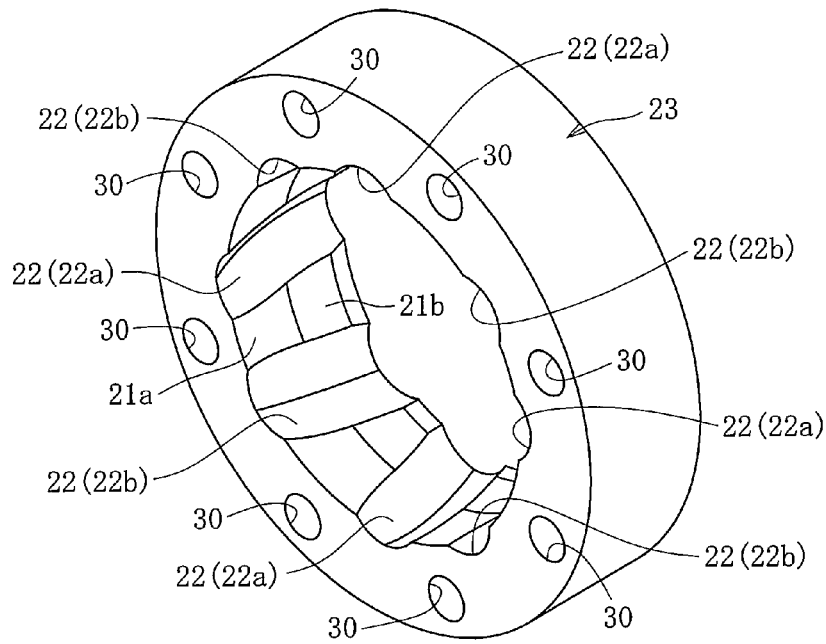
[FIG. 4] A perspective view illustrating an outer joint member of the fixed type constant velocity universal joint.
Figure 5:
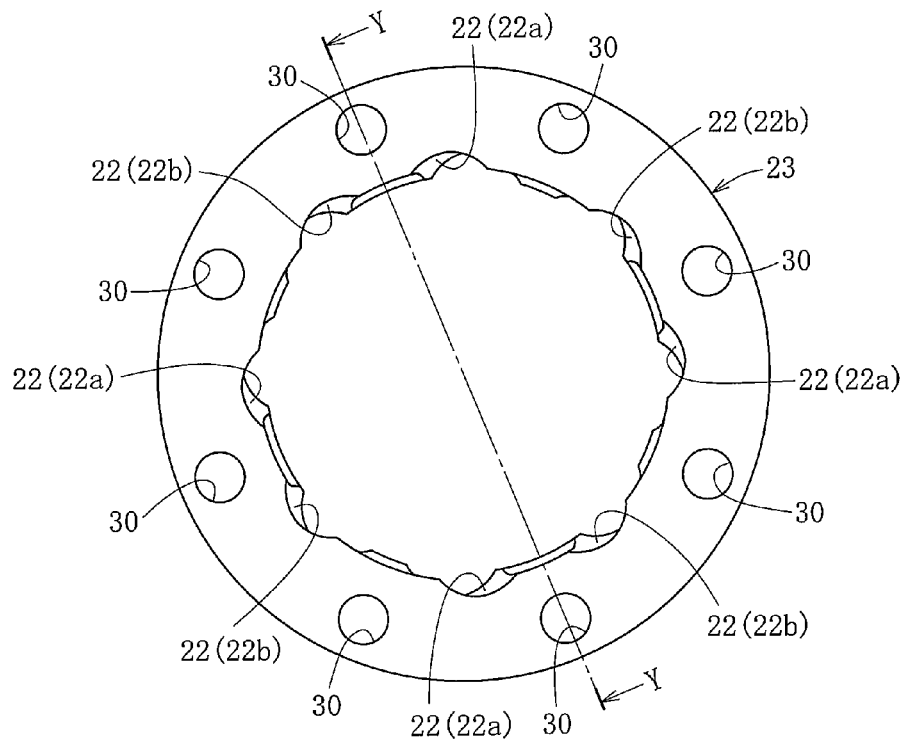
[FIG. 5] A front view illustrating the outer joint member of the fixed type constant velocity universal joint.

As illustrated in FIGS. 1 to 3, a fixed type constant velocity universal joint according to a first embodiment of the present invention comprises: an outer joint member 23 having an inner surface 21 in which a plurality of (eight) track grooves 22 are formed along an axial direction; an inner joint member 26 having an outer surface 24 in which a plurality of (eight) track grooves 25 are formed along the axial direction; a plurality of (eight) torque transmitting balls 27 arranged in ball tracks formed by pairs of the track grooves 22 of the outer joint member 23 and the track grooves 25 of the inner joint member 26; and a cage 28 interposed between the inner surface 21 of the outer joint member 23 and the outer surface 24 of the inner joint member 26, for retaining the torque transmitting balls 27.

A female spline 45 is formed in an inner surface of a hole portion 47 of the inner joint member 26. Into the hole portion 47 of the inner joint member 26, a male spline 46 of a shaft 31 is fitted, and thus the male spline 46 is fitted to the female spline 45 of the inner joint member 26. Further, to an end portion of the male spline 46, a snap ring 33 for preventing slipping-off is fitted.

In order to seal opening portions of the outer joint member 23, an end cap 35 and a flexible boot 36 are mounted thereto. The flexible boot 36 comprises a bellows 38 made of a rubber material or a resin material, and a cylindrical adapter 39 made of a metal. The bellows 38 comprises a small-diameter end portion 38a outwardly fitted to the shaft 31, a large-diameter end portion 38b connected to the adapter 39, and a bent portion 38c provided between the small-diameter end portion 38a and the large-diameter end portion 38b. The small-diameter end portion 38a of the bellows 18 is fastened by a band 40 and thus fixed to the shaft 31. The adapter 39 comprises a caulked portion 39a caulked and fixed to the large-diameter end portion 38b of the bellows 38, and an annular flange portion 39b fitted to the outer joint member 23.

A companion flange 41 is mounted to the outer joint member 23. The companion flange 41 comprises: a base 41a mounted to the opening portion of the outer joint member 23 situated on a side opposite to the adapter 39; and a cylinder body 41b provided continuously to the base 41a. The base 41a comprises a thick portion 42 and a thin portion 43, and the end cap 35 is inwardly fitted to the thick portion 42. The end cap 35 comprises a disc-like body portion 35b and an annular flange portion 35a inwardly fitted to the thick portion 42.

Figure 23:
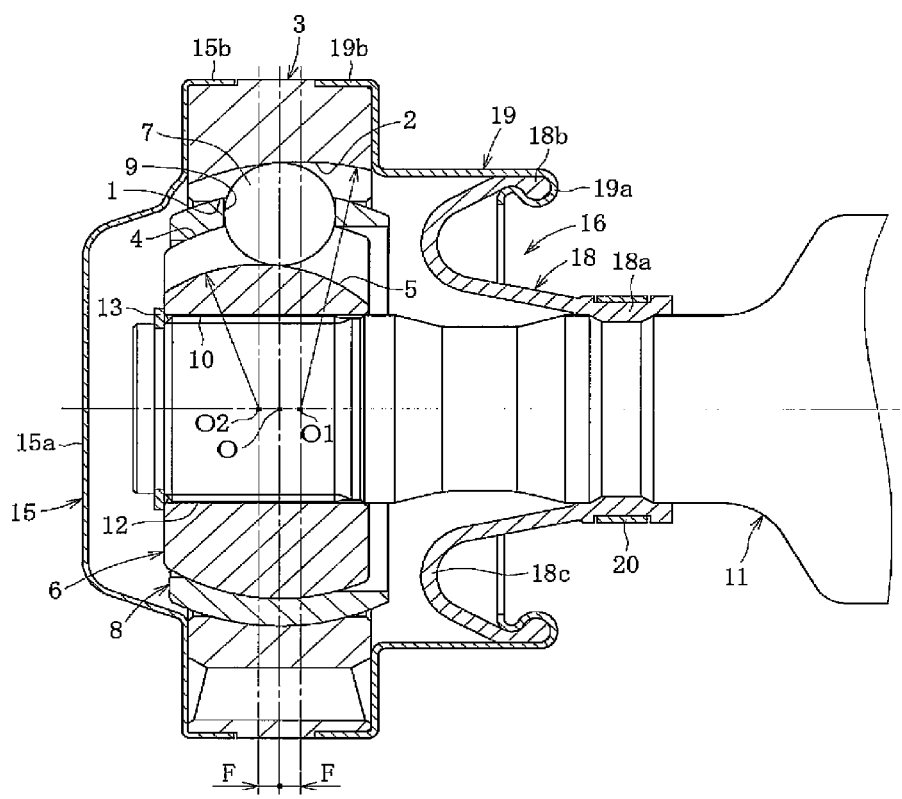
[FIG. 23] A cross-sectional view illustrating a conventional fixed type constant velocity universal joint.
Figure 24:
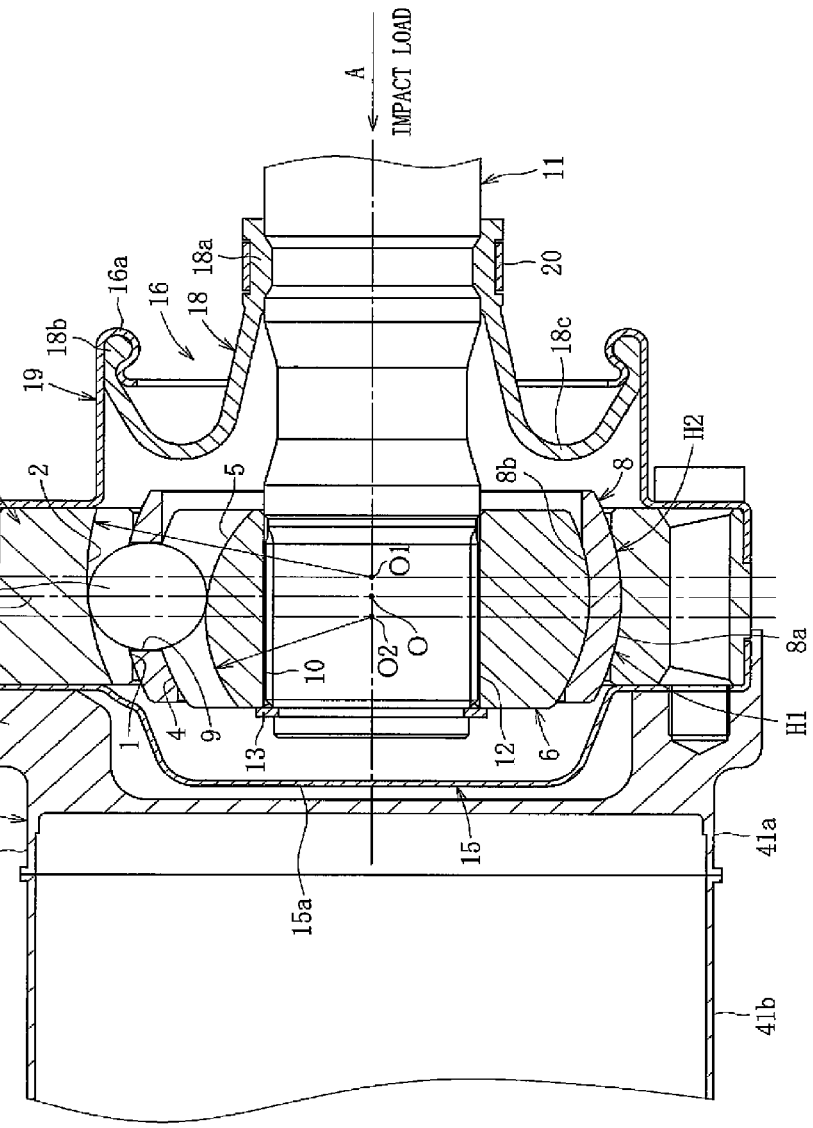
[FIG. 24] A cross-sectional view illustrating in the conventional fixed type constant velocity universal joint a state in which the impact load is applied thereto.

As illustrated in FIG. 3, the track groove 22 of the outer joint member 23 has a track groove bottom formed only of an arc portion, and a curvature center O1 of the track groove 22 coincides with a joint center O. Further, the track groove 25 of the inner joint member 26 has a track groove bottom formed only of an arc portion, and a curvature center O2 of the track groove 25 coincides with the joint center O. That is, unlike in the conventional fixed type constant velocity universal joint illustrated in FIG. 23, the track groove 22 of the outer joint member 23 and the track groove 25 of the inner joint member 26 are not offset in the axial direction.

Figure 6:
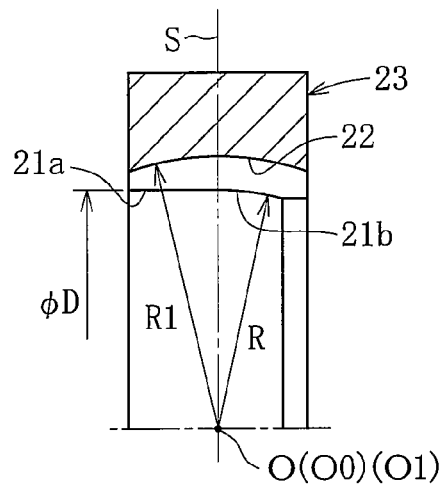
[FIG. 6] A cross-sectional view illustrating the outer joint member of the fixed type constant velocity universal joint.
Figure 7:
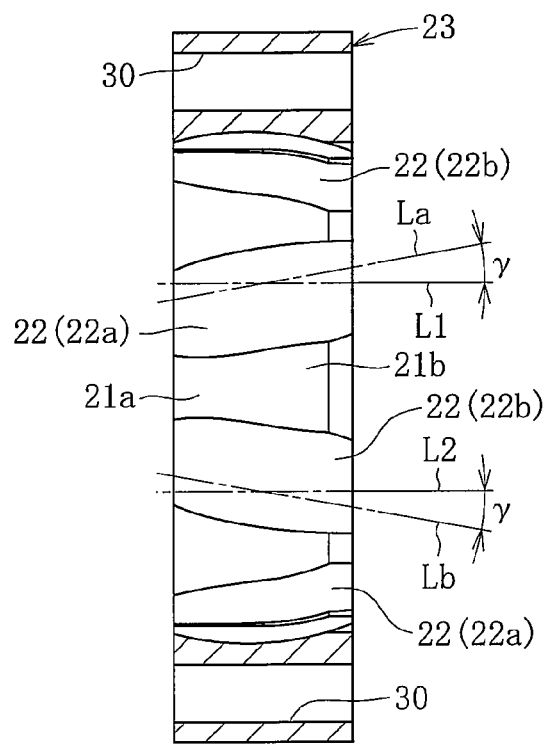
[FIG. 7] A cross-sectional view taken along the line Y-Y of FIG. 5.
Figure 8:
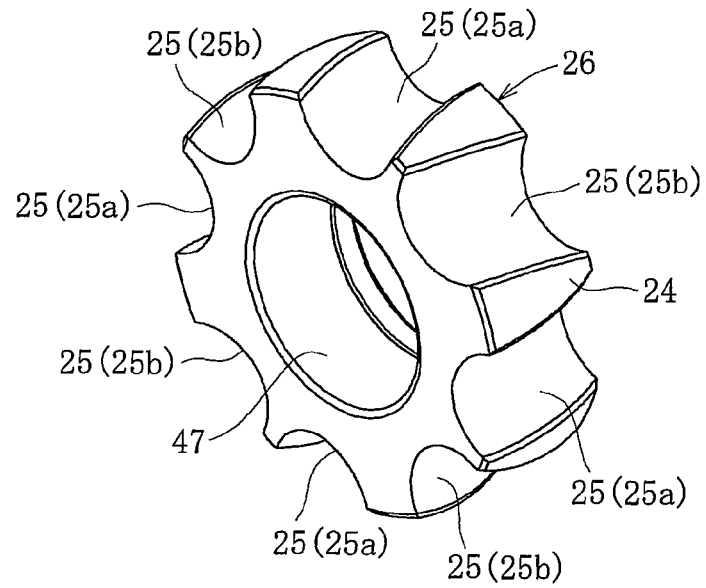
[FIG. 8] A perspective view illustrating an inner joint member of the fixed type constant velocity universal joint.
Figure 9:
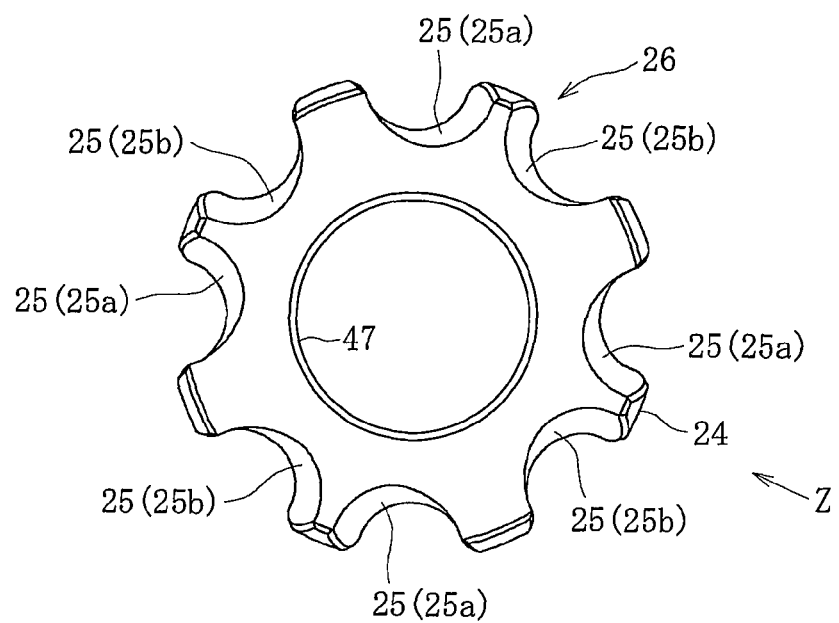
[FIG. 9] A front view illustrating the inner joint member of the fixed type constant velocity universal joint.
Figure 10:
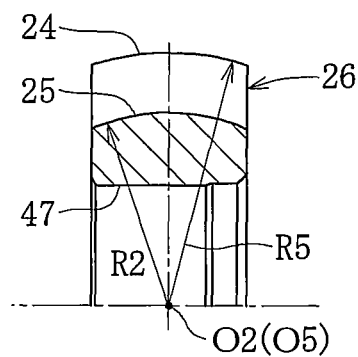
[FIG. 10] A cross-sectional view illustrating the inner joint member of the fixed type constant velocity universal joint.

Further, as illustrated in FIGS. 4 to 7, the track grooves 22 of the inner surface 21 of the outer joint member 23 comprise track grooves 22a, 22b inclined in mutually opposite directions with respect to the axis. That is, as illustrated in FIG. 7, an axis La of each of the first track grooves 22a is inclined by a predetermined angle γ in a counterclockwise direction of FIG. 7 with respect to a straight line L1 that is parallel to a joint axis. An axis Lb of each of the second track grooves 22b is inclined by the predetermined angle γ in a clockwise direction of FIG. 7 with respect to a straight line L2 that is parallel to the joint axis. Note that, in the outer joint member 23, through-holes 30 are provided at predetermined pitches along a peripheral direction. As in the conventional fixed type constant velocity universal joint, the through-holes 30 are provided for fitting the flexible boot 36 onto the outer joint member 23, and a bolt member 50 is inserted through each of the through-holes 30. At this time, the bolt member 50 is screwed into a screw hole 51 provided in the thick portion 42 of the base 41a of the companion flange 41.

As illustrated in FIG. 6 and the like, the inner surface 21 of the outer joint member 23 is formed of: a cylindrical surface 21a situated on a deep side (end cap side) with respect to a plane S which passes through the joint center O and is orthogonal to an axial center of the shaft in a state in which an operating angle is not formed; and a spherical surface 21b situated on an inlet side (side opposite to the end cap) with respect to the plane S. Specifically, an equation 2R=D is satisfied, where R represents a curvature radius of the spherical surface 21b and D represents an inner diameter dimension of the cylindrical surface 21a.

Figure 11:
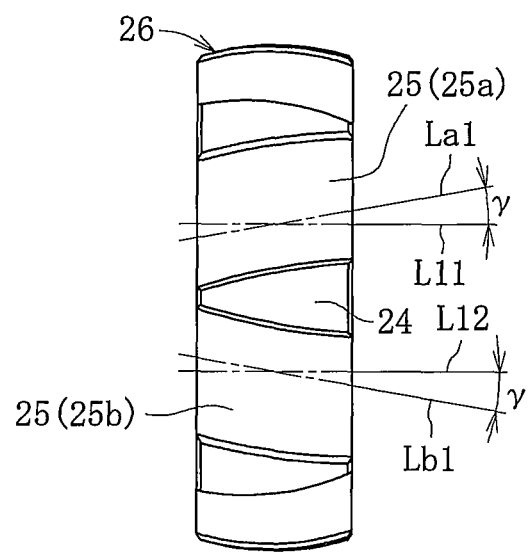
[FIG. 11] A view taken in the arrow "Z" direction of FIG. 9.

As illustrated in FIGS. 8 to 11, the outer surface 24 of the inner joint member 26 is formed of a spherical surface, and the track grooves 25 of the inner joint member 26 comprise track grooves 25a, 25b inclined in mutually opposite directions with respect to the axis. That is, as illustrated in FIG. 11, an axis La1 of each of the first track grooves 25a is inclined by the predetermined angle γ in a clockwise direction of FIG. 11 with respect to a straight line L11 that is parallel to the joint axis. An axis Lb1 of each of the second track grooves 25b is inclined by the predetermined angle γ in a counterclockwise direction of FIG. 11 with respect to a straight line L12 that is parallel to the joint axis.

Figure 12:
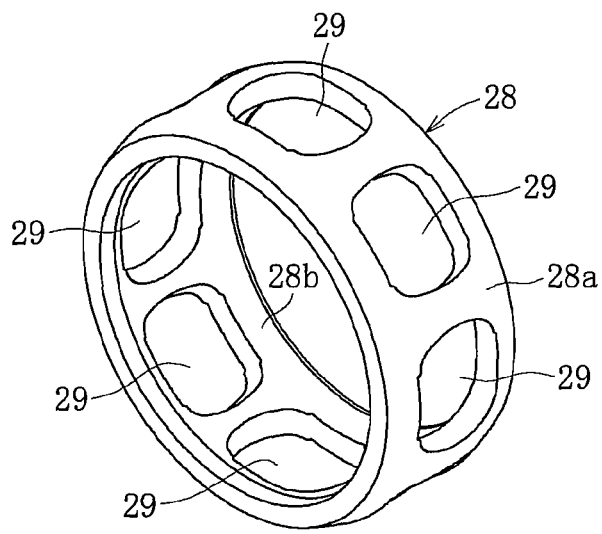
[FIG. 12] A perspective view illustrating a cage of the fixed type constant velocity universal joint.
Figure 13:
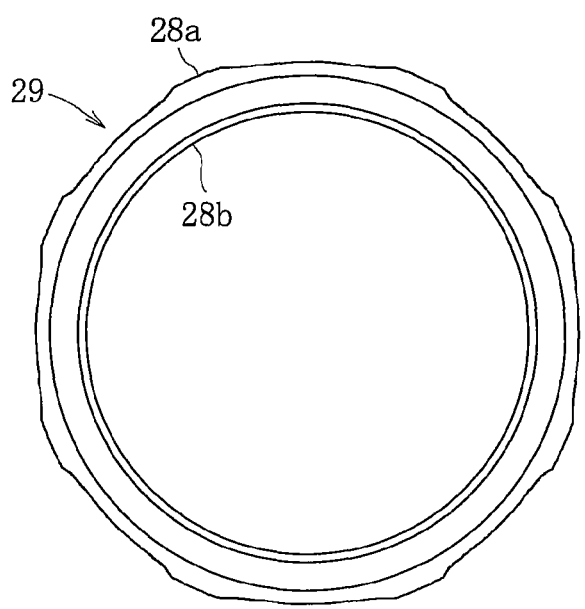
[FIG. 13] A front view illustrating the cage of the fixed type constant velocity universal joint.
Figure 14:
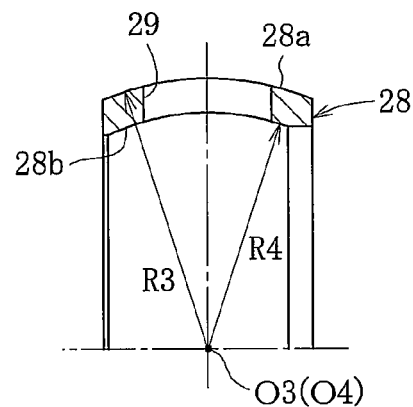
[FIG. 14] A cross-sectional view illustrating the cage of the fixed type constant velocity universal joint.

As illustrated in FIGS. 12 to 14, pockets 29 for retaining the balls 27 are provided in a peripheral wall of the cage 28 at predetermined peripheral pitches. In this case, an outer surface of the peripheral wall is referred to as an outer spherical surface 28a, and an inner surface of the peripheral wall is referred to as an inner spherical surface 28b.

A curvature center O3 of the outer spherical surface 28a and a curvature center O4 of the inner spherical surface 28b coincide with each other. In this case, the curvature center O3 of the outer spherical surface 28a and a center O0 of the inner surface 21 of the outer joint member 23 coincide with each other, and a curvature radius R3 of the outer spherical surface 28a is substantially equal to a radius R of the spherical surface 21b on the inlet side of the inner surface 21 of the outer joint member 23. Accordingly, as illustrated in FIG. 3, the inlet side of the outer spherical surface 28a is held in contact with the spherical surface 21b of the outer joint member 23. Further, the curvature center O4 of the inner spherical surface 28b and a curvature center O5 of the outer surface 24 of the inner joint member 26 coincide with each other, and a curvature radius R4 of the inner spherical surface 28b (see FIG. 14) is substantially equal to a curvature radius R5 of the outer surface 24 of the inner joint member 26 (see FIG. 10). Accordingly, the inner spherical surface 28b of the cage 28 is held in slide-contact with the entire outer surface 24 of the inner joint member 26.

As described above, according to the fixed type constant velocity universal joint of the present invention, the outer joint member 23 comprises the track grooves 22a, 22b which are inclined in mutually opposite directions with respect to the axis and formed alternately in a circumferential direction, and the inner joint member 26 comprises the track grooves 25a, 25b which are inclined in mutually opposite directions with respect to the axis and formed alternately in the circumferential direction. Thus, as illustrated in FIG. 16, the track groove 22 of the outer joint member 23 and the track groove 25 of the inner joint member 26 cross each other.

Figure 15:
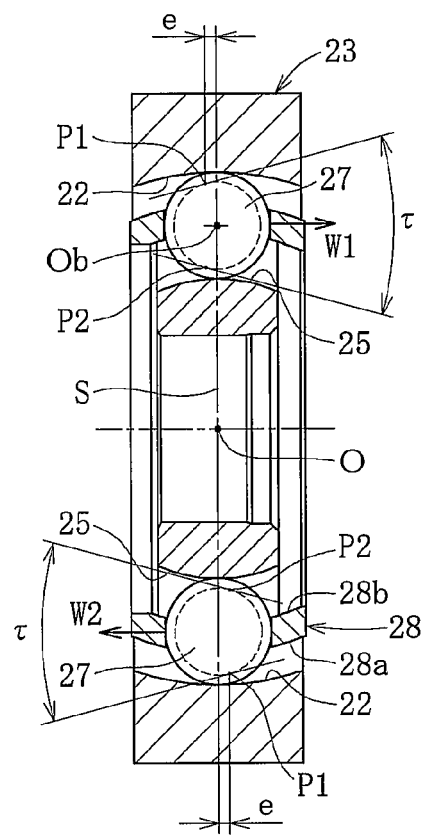
[FIG. 15] A cross-sectional view illustrating the fixed type constant velocity universal joint in a torque applied state.
Figure 16:
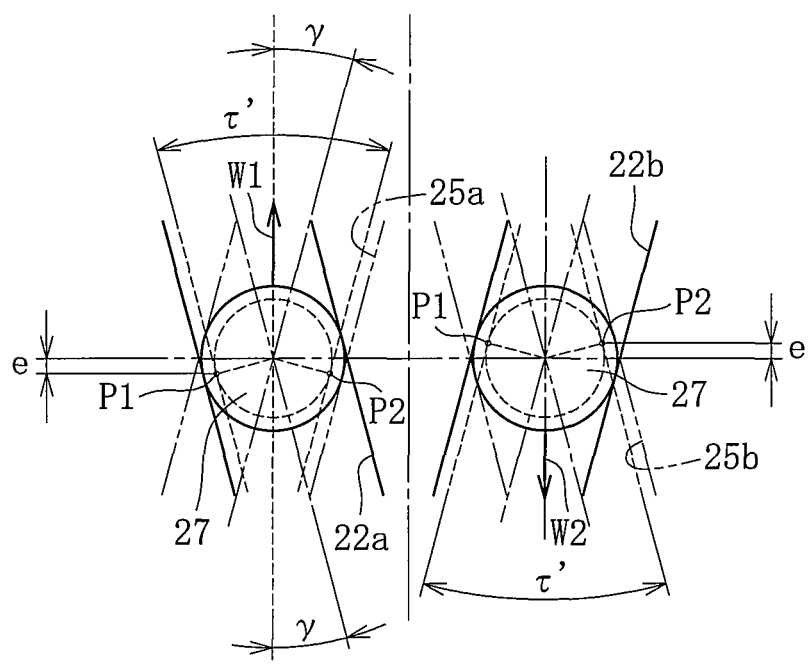
[FIG. 16] A simplified developed view illustrating the fixed type constant velocity universal joint in the torque applied state.

In FIG. 16, solid lines show the track groove 22 of the outer joint member 23, and chain double-dashed lines show the track groove 25 of the inner joint member 26. Further, in FIG. 15, P1 represents a contact point at which the ball 27 is held in contact with the track groove 22 of the outer joint member 23, and P2 represents a contact point at which the ball 27 is held in contact with the track groove 25 of the inner joint member 26. In this case, the contact point P1 at the first track groove 22a and the contact point P2 at the first track groove 25a are displaced by a predetermined amount e to one opening side with respect to the plane S which passes through a ball center Ob of the ball 27 and the joint center O in a state in which the operating angle is not formed. Further, the contact point P1 at the second track groove 22b and the contact point P2 at the second track groove 25b are displaced by the predetermined amount e to the other opening side with respect to the above-mentioned plane S.

Thus, owing to an influence of the crossing angle γ, as illustrated in FIGS. 15 and 16, the balls 27 adjacent to each other in the peripheral direction form wedge angles τ, τ' in mutually opposite directions. That is, forces act alternately on the adjacent pockets 29, and the wedge angles τ, τ' are formed in alternately opposite directions. Therefore, in the first track grooves 22a, 25a, a force W1 acts in a direction opposite to the contact points P1, P2. In contrast, in the second track grooves 22b, 25b, a force W2 acts toward the contact points P1, P2. Accordingly, a position of the cage is stabilized at a position in a bisecting plane of the inner and outer joint members.

According to the above-mentioned fixed type constant velocity universal joint, the forces act alternately on the adjacent pockets 29, and the wedge angles are formed in alternately opposite directions. Thus, the position of the cage is stabilized at the position in the bisecting plane of the inner and outer joint members. Accordingly, spherical-surface contacts of the outer spherical surface 28a and the inner spherical surface 28b of the cage are controlled. Thus, the joint smoothly works under high load and during high-speed rotation, and heat generation is suppressed, with the result that durability can be improved.

Figure 17:
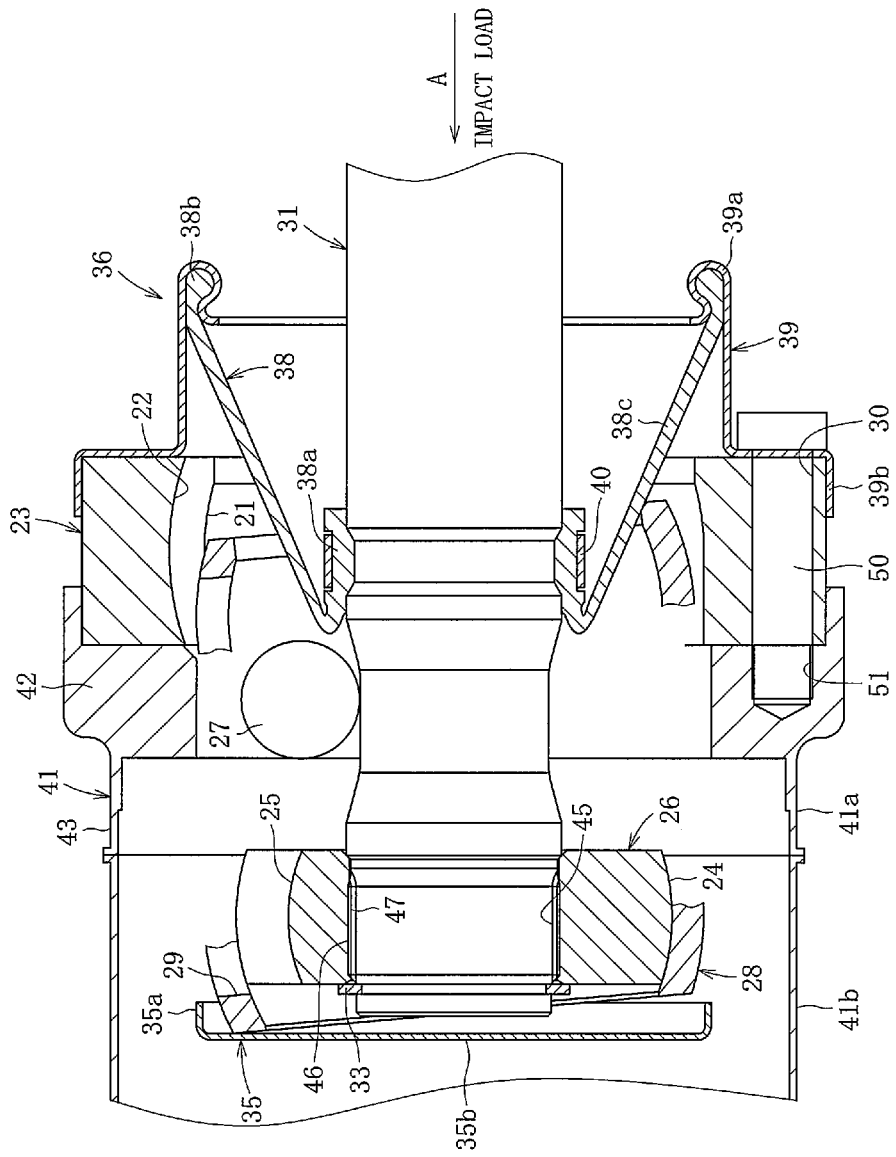
[FIG. 17] A cross-sectional view illustrating the fixed type constant velocity universal joint in a state in which the cage is broken by application of an impact load.

Further, axial strength of the deep side with respect to the joint center O can be reduced. When the impact load is applied in an arrow "A" direction as illustrated in FIG. 17, the cage 28 is likely to slip out of the outer joint member 23 to the side (i.e., deep side) that is reduced in axial strength. However, the balls 27 are fitted in the cage 28, and in addition, on the side held in contact with the spherical surface of the inner surface of the outer joint member 23, the cage 28 is increased in axial strength. Accordingly, when the impact load is applied, as illustrated in FIG. 17, the cage 28 is broken so that the outer joint member 23 and the shaft 31 mounted to the inner joint member 26 can be moved in mutually approaching directions. This can absorb the impact load or lessen the impact.

A contact between the inner surface 21 of the outer joint member 23 and the outer spherical surface 28a of the cage 28 is produced at the spherical surface 21b of the inner surface, and hence the spherical-surface contact of the cage is reduced. Accordingly, it is possible to suppress heat generation generated by friction or the like, and to improve durability.

A contact area between the cage 28 and the inner surface 21 of the outer joint member 23 is small. Thus, the inner surface 21 of the outer joint member 23 and the outer spherical surface (outer surface) 28a of the cage 28 do not need to be subjected to precision machining such as cutting of hardened steel or grinding performed after heat treatment. That is, each of the inner surface 21 of the outer joint member 23 and the outer spherical surface 28a of the cage 28 may remain as an as-forged surface. Thus, it is possible to reduce cost and improve productivity. The track grooves 22, 25 may be formed by forge finishing, or by machining, that is, finishing (grinding or cutting of hardened steel).

The above-mentioned embodiment exemplifies the joint using eight balls, but the present invention is also applicable to joints using six balls or ten balls. Thus, when the number of balls is increased, it is possible to reduce a size and a weight of the joint while ensuring a load capacity.

Figure 18:
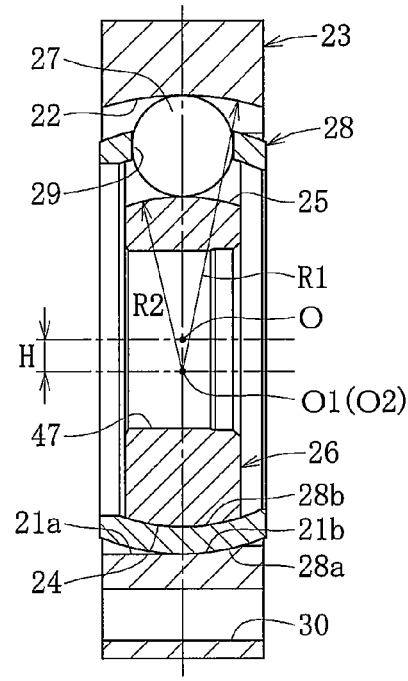
[FIG. 18] A cross-sectional view illustrating the constant velocity universal joint in a case where a curvature center of a track groove is displaced in a separating direction with respect to a joint center.
Figure 19:
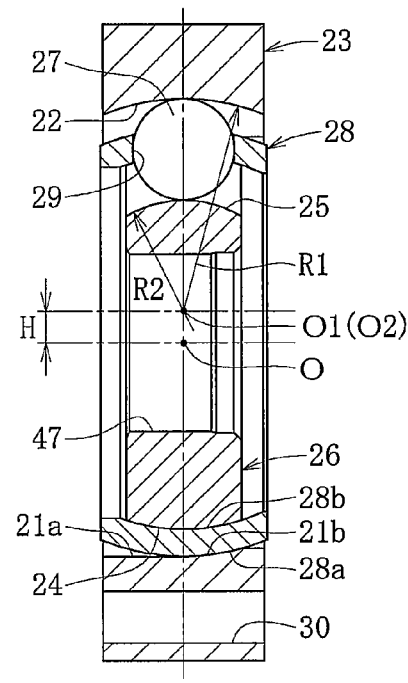
[FIG. 19] A cross-sectional view illustrating the constant velocity universal joint in a case where the curvature center of the track groove is displaced in an approaching direction with respect to the joint center.

Next, as illustrated in FIGS. 18 and 19, the curvature center O1 of the track groove 22 of the outer joint member 23 and the curvature center O2 of the track groove 25 of the inner joint member 26 are displaced in the radial direction with respect to the joint center O. FIG. 18 illustrates a case where the curvature center O1, O2 is displaced to a position farther than that of the joint center O by an offset amount H with respect to the joint center O. Further, FIG. 19 illustrates a case where the curvature center O1, O2 is displaced to a position closer than that of the joint center O by the offset amount H with respect to the joint center O.

Figure 20:
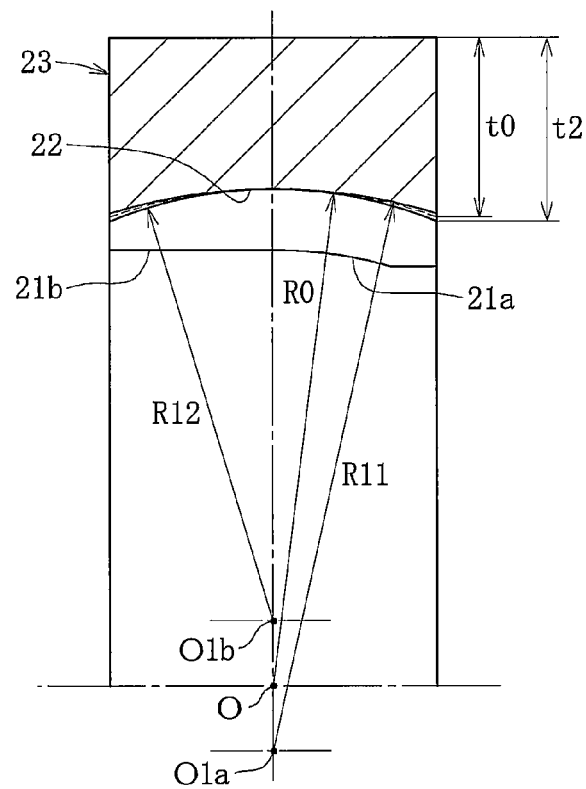
[FIG. 20] A cross-sectional view illustrating the outer joint member in a state in which the curvature center of the track groove is offset in a radial direction.
Figure 21:
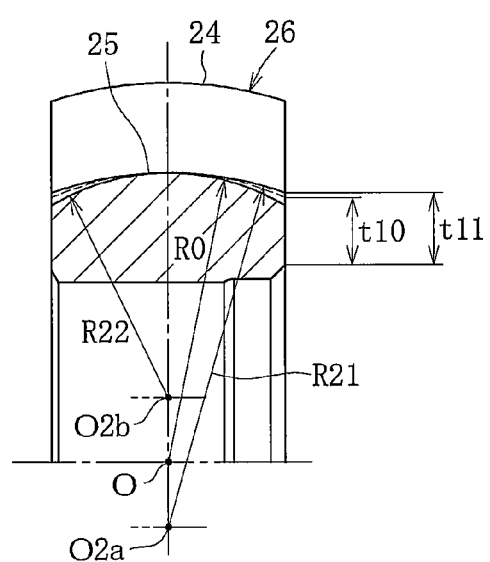
[FIG. 21] A cross-sectional view illustrating the inner joint member in a state in which the curvature center of the track groove is offset in the radial direction.

FIG. 20 illustrates the outer joint member 23 in a case where the curvature center O1 is disposed at a position farther than that of the joint center O and in a case where the curvature center O1 is disposed at a position closer than that of the joint center O. In FIG. 20, O1a represents the curvature center of the track groove 22 of the outer joint member 23 disposed at a position farther than that of the joint center O, and O1b represents the curvature center of the track groove 22 of the outer joint member 23 disposed at a position closer than that of the joint center O. Further, FIG. 21 illustrates the inner joint member 26 in a case where the curvature center O2 is disposed at a position farther than that of the joint center O and in a case where the curvature center O2 is disposed at a position closer than that of the joint center O. In FIG. 21, O2a represents the curvature center of the track groove 25 of the inner joint member 26 disposed at a position farther than that of the joint center O, and O2b represents the curvature center of the track groove 25 of the inner joint member 26 disposed at a position closer than that of the joint center O.

In a case where the curvature center O1 of the track groove 22 of the outer joint member 23 and the curvature center O2 of the track groove 25 of the inner joint member 26 are displaced in a separating direction with respect to the joint center O, the track groove 22 of the outer joint member 23 can be enlarged, and the load capacity can be increased. In addition, a thickness of an opening portion at an axial end portion of the track groove 25 of the inner joint member 26 can be increased, and the inner joint member 26 can be stably coupled to the shaft which is fitted into a hole portion of the inner joint member 26. Further, in a case where the curvature center O1 of the track groove 22 of the outer joint member 23 and the curvature center O2 of the track groove 25 of the inner joint member 26 are displaced in an approaching direction with respect to the joint center O, the load capacity of the track groove 25 of the inner joint member 26 can be increased, and a thickness of the outer joint member 23 can be increased, which stabilizes strength.

In FIG. 20, t0 represents a thickness of the outer joint member at the axial end portion of the track groove 22 in a case where the curvature center O1 of the track groove 22 coincides with the joint center O, and t2 represents a thickness of the outer joint member at the axial end portion of the track groove 22 in a case where the curvature center O1 of the track groove 22 is displaced in the approaching direction with respect to the joint center O. Further, in FIG. 21, t10 represents a thickness of the inner joint member at the axial end portion of the track groove 25 in a case where the curvature center O2 of the track groove 25 coincides with the joint center O, and t11 represents a thickness of the inner joint member at the axial end portion of the track groove 25 in a case where the curvature center O2 of the track groove 25 is displaced in the separating direction with respect to the joint center O.

Figure 22:
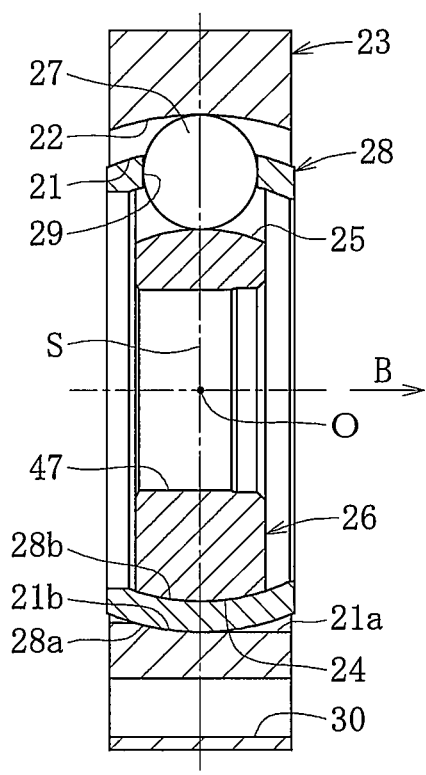
[FIG. 22] A cross-sectional view illustrating a fixed type constant velocity universal joint according to another embodiment of the present invention.

A fixed type constant velocity universal joint illustrated in FIG. 22 comprises: the cylindrical surface 21a of the inner surface 21 of the outer joint member 23, which is situated on the inlet side with respect to the joint center, i.e., the plane S; and the spherical surface 21b of the inner surface 21 of the outer joint member 23, which is situated on the deep side with respect to the joint center, i.e., the plane S, and is held in slide-contact with the outer spherical surface 28a of the cage 28.

Note that, other components of the fixed type constant velocity universal joint illustrated in FIG. 22 are the same as those of the fixed type constant velocity universal joint illustrated in FIG. 1 and the like. Thus, the same members are denoted by the same reference symbols of FIG. 1 and the like, and description thereof is omitted. Accordingly, the fixed type constant velocity universal joint illustrated in FIG. 22 also exerts the same functions and effects of the fixed type constant velocity universal joint illustrated in FIG. 1 and the like.

In particular, in the fixed type constant velocity universal joint illustrated in FIG. 22, the axial strength of the inlet side with respect to the joint center O can be reduced, and hence the cage 28 is likely to slip out of the outer joint member 23 to the side (i.e., inlet side) that is reduced in axial strength. However, the balls 27 are fitted in the cage 28, and in addition, on the side held in contact with the spherical surface 21b of the inner surface 21 of the outer joint member 23, the cage 28 is increased in axial strength. Accordingly, when the impact load is applied in an arrow "B" direction, the cage 28 is broken so that the outer joint member 23 and the shaft mounted to the inner joint member 26 can be moved in mutually separating directions. This can absorb the impact load or lessen the impact.

The embodiments of the present invention are described above, but the present invention is not limited to the above-mentioned embodiments and various modifications can be made thereto. For example, instead of the cylindrical surface 21a formed in the inner surface of the outer joint member 23, there may be formed a tapered surface increasing in diameter from the spherical surface 21b side to a side opposite to the spherical surface. Note that, the outer joint member 23 of the constant velocity universal joint illustrated in FIG. 1 and the outer joint member 23 of the constant velocity universal joint illustrated in FIG. 22 are symmetrical with respect to the plane S. Accordingly, through turning one outer joint member 23 around, it is possible to achieve the shared use of the outer joint member 23 of the constant velocity universal joint illustrated in FIG. 1 and the outer joint member 23 of the constant velocity universal joint illustrated in FIG. 22.

Industrial Applicability

The constant velocity universal joint comprises an impact absorbing mechanism for absorbing and lessening the impact at the time of application of the impact load. At the time of application of the impact load, the cage is broken so that the shaft can be moved relative to the outer joint member toward the side that is reduced in axial strength. This absorbs the impact load or lessens the impact. The outer joint member is shaped into a short cylinder. Both opening portions of the outer joint member are sealed with the end cap and the flexible boot, respectively.

REFERENCE SIGNS LIST 21 inner surface
21a cylindrical surface
21b spherical surface
22, 22a track groove
23 outer joint member
24 outer surface
25, 25a, 25b track groove
26 inner joint member
27 torque transmitting ball
28 cage

The invention claimed is:

1. A fixed type constant velocity universal joint, comprising:
   an outer joint member having an inner surface in which track grooves are formed, the track grooves each having a bottom surface formed of a circular arc surface, and openings provided at a deep side and an inlet side of the outer joint member;
   an inner joint member having an outer surface in which track grooves are formed, the track grooves each having a bottom surface formed of a circular arc surface;
   a plurality of torque transmitting balls arranged in ball tracks formed by pairs of the track grooves of the outer joint member and the track grooves of the inner joint member;
   a cage interposed between the inner surface of the outer joint member and the outer surface of the inner joint member, for retaining the plurality of torque transmitting balls; and
   a companion flange connected to the deep side of the outer joint member,
   wherein:
   an axial offset amount of a curvature center of each of the track grooves of the outer joint member and an axial offset amount of a curvature center of each of the track grooves of the inner joint member are zero;
   the track grooves of the outer joint member are formed alternately in a circumferential direction to be inclined in mutually opposite directions with respect to an axis, the track grooves of the inner joint member are formed alternately in the circumferential direction to be inclined in mutually opposite directions with respect to the axis, and the track grooves of the outer joint member and the track grooves of the inner joint member which are opposed in the radial direction cross each other;
   the deep side of the inner surface of the outer joint member with respect to a joint center is formed into a cylindrical surface, and the inlet side of the inner surface of the outer joint member with respect to the joint center is formed into a spherical surface which is held in slide-contact with an outer spherical surface of the cage; and
   the companion flange has a bore in communication with the opening at the deep side of the outer joint member, a diameter of the bore of the companion flange is larger than a diameter of the cylindrical surface of the outer joint member, and an axial dimension of the bore of the companion flange is larger than an axial dimension of the inner joint member.

2. The fixed type constant velocity universal joint of claim 1, wherein the inner surface of the outer joint member is formed by forging.

3. The fixed type constant velocity universal joint of claim 1, wherein an outer surface of the cage is formed by forging.

4. The fixed type constant velocity universal joint of claim 1, wherein the track grooves are formed by forging.

5. The fixed type constant velocity universal joint of claim 1, wherein the track grooves are formed by machining.

6. The fixed type constant velocity universal joint of claim 1, wherein a number of the plurality of torque transmitting balls is selected from 6, 8, or 10.

7. The fixed type constant velocity universal joint of claim 1, wherein the curvature center of each of the track grooves of the outer joint member and the curvature center of each of the track grooves of the inner joint member are displaced in a radial direction with respect to the joint center.

8. A fixed type constant velocity universal joint, comprising:
an outer joint member having an inner surface in which track grooves are formed, the track grooves each having a bottom surface formed of a circular arc surface, and openings provided at a deep side and an inlet side of the outer joint member;
an inner joint member having an outer surface in which track grooves are formed, the track grooves each having a bottom surface formed of a circular arc surface;
a plurality of torque transmitting balls arranged in ball tracks formed by pairs of the track grooves of the outer joint member and the track grooves of the inner joint member;
a cage interposed between the inner surface of the outer joint member and the outer surface of the inner joint member, for retaining the plurality of torque transmitting balls; and
a companion flange connected to the deep side of the outer joint member,
wherein:
an axial offset amount of a curvature center of each of the track grooves of the outer joint member and an axial offset amount of a curvature center of each of the track grooves of the inner joint member are zero;
the track grooves of the outer joint member are formed alternately in a circumferential direction to be inclined in mutually opposite directions with respect to an axis, the track grooves of the inner joint member are formed alternately in the circumferential direction to be inclined in mutually opposite directions with respect to the axis, and the track grooves of the outer joint member and the track grooves of the inner joint member which are opposed in the radial direction cross each other;
the deep side of the inner surface of the outer joint member with respect to a joint center is formed into a cylindrical surface, and the inlet side of the inner surface of the outer joint member with respect to the joint center is formed into a spherical surface which is held in slide-contact with an outer spherical surface of the cage;
the companion flange has a bore in communication with the opening at the deep side of the outer joint member, a diameter of the bore of the companion flange is larger than a diameter of the cylindrical surface of the outer joint member, and an axial dimension of the bore of the companion flange is larger than an axial dimension of the inner joint member;
the bore of the companion flange is arranged and configured such that the inner joint member can be displaced to a position in which the inner joint member is entirely within the bore of the companion flange by an impact force which breaks the cage.

9. The fixed type constant velocity universal joint of claim 8, further comprising an end cap fitted to the bore of the companion flange, wherein the end cap seals the opening of the outer joint member on the deep side of the outer joint member.

10. The fixed type constant velocity universal joint of claim 8, wherein the inner surface of the outer joint member is formed by forging.

11. The fixed type constant velocity universal joint of claim 8, wherein an outer surface of the cage is formed by forging.

12. The fixed type constant velocity universal joint of claim 8, wherein the track grooves are formed by forging.

13. The fixed type constant velocity universal joint of claim 8, wherein the track grooves are formed by machining.

14. The fixed type constant velocity universal joint of claim 8, wherein a number of the plurality of torque transmitting balls is selected from 6, 8, or 10.

15. The fixed type constant velocity universal joint of claim 8, wherein the curvature center of each of the track grooves of the outer joint member and the curvature center of each of the track grooves of the inner joint member are displaced in a radial direction with respect to the joint center.

* * * * *